United States Patent [19]

Hack et al.

[11] Patent Number: 5,429,020
[45] Date of Patent: Jul. 4, 1995

[54] LATHE

[75] Inventors: Eberhard Hack, Dettingen/Teck; Günter Schleich, Hochdorf, both of Germany

[73] Assignee: Index-Werke GmbH & Co. KG Hahn & Tessky, Esslingen, Germany

[21] Appl. No.: 107,444

[22] Filed: Aug. 16, 1993

[30] Foreign Application Priority Data

Sep. 3, 1992 [DE] Germany ............... 42 29 423.1

[51] Int. Cl.⁶ .................... B23B 17/00; B23B 3/00; B23Q 1/02
[52] U.S. Cl. ........................... 82/117; 82/121; 82/149
[58] Field of Search ............... 82/117, 118, 120, 121, 82/132, 137, 149

[56] References Cited

U.S. PATENT DOCUMENTS

| 4,506,569 | 3/1985 | Brown et al. | 82/117 |
| 4,545,271 | 10/1985 | Romi | 82/149 |
| 4,662,253 | 5/1987 | Gloser et al. | 82/149 |
| 4,893,532 | 1/1990 | Walburn et al. | 82/148 |
| 4,936,174 | 6/1990 | Holt et al. | 82/117 |

FOREIGN PATENT DOCUMENTS

| 0239564 | 3/1987 | European Pat. Off. |
| 3921649 | 6/1989 | Germany . |
| 3937330 | 11/1989 | Germany . |

Primary Examiner—Willilam E. Terrell
Attorney, Agent, or Firm—Leydig, Voit & Mayer, Ltd.

[57] ABSTRACT

Lathe comprising at least a headstock, a slide bed and two tool carrier bed-side carriages guided for displacement on longitudinal sides of the slide bed in the direction of the Z-axis, in which the machining plane defined by the Z-axis and the X-axis of this lathe forms an angle with the horizontal, whereby in order to increase the space available for the bed-side carriages the longitudinal sides of the slide bed bearing the two bed-side carriages extend transversely to the machining plane and are arranged on sides of the slide bed facing away from one another.

15 Claims, 6 Drawing Sheets

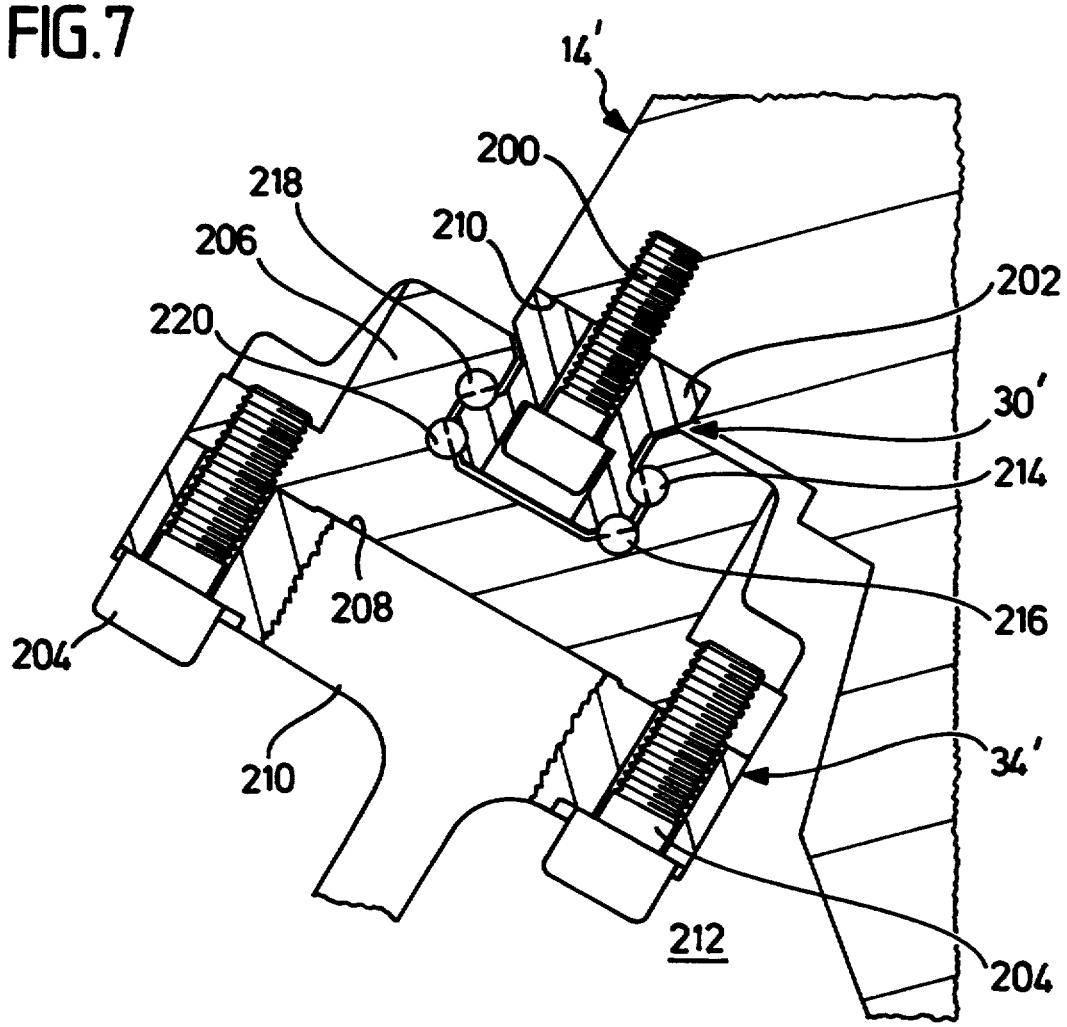

LATHE

TECHNICAL FIELD

The invention relates to a lathe having at least one workpiece spindle, in particular two workpiece spindles located opposite one another and having coaxial spindle axes, as well as two tool carriers designed, in particular, as tool turrets, each borne by a tool carrier slide system and arranged on both sides of the spindle axis.

BACKGROUND

Lathes of this type, which are known, for example, from DE-A-30 35 451 or DE-A-35 14 069, usually have a horizontal machining plane. However, lathes of this type can, in principle, also be constructed such that the machining plane extends vertically or is inclined relative to a vertical plane by, for example, 30° (so-called sloping bed machines). The machining plane is hereby to be understood as that plane which is defined by the spindle axis and the direction of the so-called X-axis of the lathe because the cutting edges of tools of the two tool carriers, which are located in operating position, are displaced in this plane when they are moved forward towards the spindle axis, parallel to the X-axis in a radial direction relative to the spindle axis, in order to reduce the diameter of a workpiece to be machined.

The known lathes resulting from the publications cited above have a machine base with a horizontal upper side, on which bar-like guideways (Z-guides) for the bed-side carriages of two cross-slide systems, each of which bears a tool turret, are attached in front of and behind the spindle axis, these guideways extending parallel to the spindle axis direction (direction of the so-called Z-axis of the lathe). Since each of the two cross-slide systems of these known lathes has, apart from the lower slide or bed-side carriage displaceable in the direction of the Z-axis, an upper slide displaceable horizontally and at right angles to the spindle axis direction, i.e. in the direction of the X-axis of the lathe, the machining plane of these known lathes extends horizontally and parallel to the support and attachment surfaces for the Z-guides for the bed-side carriages, these surfaces being formed by the upper side of the machine base. This constructional principle has a whole series of disadvantages: Since tools held by the tool carriers must be movable in the machining plane, i.e. at a level above the upper side of the machine base predetermined by the position of the spindle axis, the bed-side carriages can only have the shape of a relatively thin plate, on which, for example, the drive motors for driving the upper slides of the two cross-slide systems must be mounted. In addition, the slide guideways, above all the Z-guides for the bed-side carriages mounted on the machine base, are located in the range of flight of the chips or shavings resulting during the machining. This can cause considerable problems which can only be solved with complex telescopic covers made of metal sheets or in an unsatisfactory manner by wiper means. The chip problem is particularly serious when a so-called tailstock, the headstock of a workpiece spindle and/or a backrest are also guided on the Z-guides for at least one of the bed-side carriages since these elements and the bed-side carriages must be displaceable independently of one another and able to be brought close to one another without any space therebetween which precludes the use of a telescopic cover.

Finally, an energy supply line to the bed-side carriage of the cross-slide system located in front of the spindle axis also poses problems in these known lathes because a line of this type is located in the flight range of the chips resulting from workpiece machining and extends transversely through the operating space of the lathe.

DE-39 21 649-A discloses a lathe of the type mentioned at the outset, in which some of the disadvantages mentioned above can be avoided or diminished. In this known lathe, a slide bed extending in the direction of the Z-axis is attached to an upper side of a machine base, this upper side being inclined forwards (towards an operator) and downwards relative to the horizontal. Z-guides for a bed-side carriage of an upper cross-slide system displaceable in the direction of the Z-axis are attached to the top of the slide bed while a front side of the slide bed, which is inclined downwards and rearwards relative to a vertical plane extending in the direction of the Z-axis, bears Z-guides for the bed-side carriage of a lower cross-slide system. The bed-side carriage of the upper cross-slide system has, roughly, the shape of a relatively thin plate with a lower side which has a saw-tooth profile when seen in cross section at right angles to the Z-axis and with an upper side, on which a Y-slide displaceable in horizontal direction at right angles to the Z-axis is guided. This Y-slide has a vertical front side extending parallel to the Z-axis and an X-slide displaceable in vertical direction is guided thereon. This X-slide bears a tool turret having an indexing axis oriented in the direction of the Z-axis. The bed-side carriage of the lower cross-slide system has an approximately triangular cross section (vertically to the Z-axis) with a front side oriented vertically and parallel to the Z-axis. An X-slide displaceable in vertical direction is guided on this front side and this X-slide likewise bears a tool turret having an indexing axis parallel to the Z-axis.

In this known lathe, the horizontally extending spindle axis of a workpiece spindle, which again defines the direction of the Z-axis, is arranged between the superposed tool turrets and the machining plane extends vertically. Due to the inclination of the front side of the slide bed rearwards and downwards, it is scarcely possible for chips or shavings to remain on the Z-guides for the bed-side carriage of the lower cross-slide system. However, an energy supply line to the bed-side carriage of the lower cross-slide system must be located in the flight range of the chips and extend in the direction of the Z-axis through the operating space of the lathe. Moreover, the bed-side carriages have to be relatively flat because the Y-slide of the upper cross-slide system is mounted on the upper bed-side carriage and, for reasons of stability, the spindle axis cannot be arranged at a large horizontal distance in front of the slide bed. This means that the thickness of the lower bed-side carriage measured in the direction of the Y-axis is limited.

All the known lathes described in the above have an additional, serious disadvantage. In order to understand this, it must first of all be explained what forces occur during an unintentional collision between a rotating chuck of the workpiece spindle, which holds a workpiece to be machined, and a tool or the tool carrier (tool turret) bearing this tool: In relation to the spindle axis, these forces are oriented tangentially and vertically to the machining plane and are correspondingly high due to the peripheral speed of the chuck which is very high in comparison with the displacement speed of a slide.

In the known lathes described in the above, which have bed-side carriages displaceable in a horizontal plane and a horizontal machining plane, these collision forces extend at right angles to the horizontal upper side of the bed bearing the two bed-side carriages and therefore result in permanent damage to the lathes since, in this direction, neither the Z-guides guiding the bed-side carriages nor the headstock mounting the workpiece spindle and placed on the horizontal upper side of the bed can avoid these forces. Such collisions do, however, also lead to permanent damage in the lathe according to DE-39 21 649-A, namely for the following reason: In this known lathe, parts of the Z-guides for the two bed-side carriages are guide bars which extend in the direction of the Z-axis and have transversely thereto a cross section which either corresponds exactly or approximately to a flat rectangle. When seen in the direction of the Z-axis, the broader transverse surfaces of these bars extend, for each respective bed-side carriage, parallel to one another, namely for the upper bed-side carriage at an angle forwards and downwards and for the lower bed-side carriage at an angle rearwards and downwards. A collision, as described in the above, results in any case in considerable forces occurring at each of these bars and these forces act in a direction, in which neither these bars nor the headstock can move.

The same applies to the forces which occur during a collision between a tool or tool holder of a tool turret just being rotated for the purpose of indexing and a workpiece, a workpiece spindle or its headstock.

SUMMARY OF THE INVENTION

The object underlying the invention was to provide a lathe of the type mentioned at the outset, in which at least one of the aforementioned disadvantages is avoided.

The solution to this object was based on a lathe comprising a machine base, at least one headstock, in which a workpiece spindle for holding a workpiece to be treated is mounted for rotation about a spindle axis defining the direction of a Z-axis of the lathe, a slide bed rigidly connected to the machine base and having longitudinal sides extending in the direction of the Z-axis, and comprising at least two tool carrier slide systems held on longitudinal sides of the slide bed for displacement in the direction of the Z-axis, each of these slide systems having a bed-side carriage guided on the slide bed in the direction of the Z-axis as well as at least one additional slide displaceable in the direction of an X-axis of the lathe extending at right angles to the Z-axis such that a tool of a tool carrier held by the relevant slide system is displaceable parallel to the X-axis in a radial direction relative to the spindle axis and the spindle axis defines a machining plane with the direction of the X-axis, this plane forming with a horizontal plane extending through the spindle axis an angle of at least approximately 45° and at the most approximately 90°, two Z-guides extending in the direction of the Z-axis being provided on each of two longitudinal sides of the slide bed for each of the respective bed-side carriages, i.e. on a lathe such as that known from DE-39 21 649-A. In order to solve the object it is suggested in accordance with the invention that a lathe of this type be constructed such that the slide bed is designed such that—when seen in the direction of the Z-axis—the two bed-side carriages are arranged on longitudinal sides of the slide bed facing away from one another and that the regions of the one longitudinal side of the slide bed provided with the two Z-guides for the one bed-side carriage extend not only parallel to one another but also parallel to the regions of the other longitudinal side of the slide bed provided with the two Z-guides for the other bed-side carriage as well as transversely to the machining plane.

In an inventive lathe, each of the two bed-side carriages can have considerably larger dimensions in a direction at right angles to the longitudinal side of the bed slide bearing it than in the case of the known lathes described above. This means it is readily possible to design at least one of the two bed-side carriages such that it forms a housing for accommodating at least one machine part and, in particular, accommodates a drive motor for displacing an additional slide borne by this bed-side carriage. In an inventive lathe, neither of the bed-side carriages need be constructed as a flat structure in order to be able to bring tools into the machining plane and avoid unfavourably large moments as a result of the forces occurring during machining of a workpiece. In addition, the machine parts arranged in the interior of a bed-side carriage are accommodated in a protected manner, and when a drive motor is arranged inside a bed-side carriage the moments of inertia occurring during acceleration and braking of the bed-side carriage are far less than in cases where such a drive motor is mounted on the side of the bed-side carriage remote from the slide bed. Also, chips cannot settle on that longitudinal side of the slide bed, on which the lower bed-side carriage is guided, insofar as they even reach this area, and so a telescopic covering or the like is not required.

Embodiments of the inventive lathe are particularly advantageous, in which the slide bed has on its longitudinal sides bearing the two bed-side carriages plane attachment surfaces extending in the direction of the Z-axis, the Z-guides being attached to these surfaces and all these attachment surfaces extending transversely to the machining plane and parallel to one another. In such a lathe, collision forces which are aligned tangentially relative to the spindle axis and oriented at right angles to the machining plane lead, at the most, to a displacement of a bed-side carriage with its Z-guides relative to the attachment surfaces of the slide bed but not to any serious damage to the lathe. This means that it is relatively simple to readjust the Z-guides and fix them in position on the slide bed. In addition, attachment surfaces on the slide bed which are plane and parallel to one another can be precision-manufactured more easily than attachment surfaces having planes forming an angle with one another.

EP-0 239 564-A2 discloses a lathe comprising a machining plane which is inclined rearwards through about 40° relative to the vertical and a machine bed having an upper longitudinal side which extends in the direction of the Z-axis and at right angles to the machining plane and is therefore inclined rearwards and downwards and bears a Z-guide for the bed-side carriage of a slide system bearing a tool turret. In addition, the machine bed has a forward longitudinal side which is adjacent its upper longitudinal side and also extends in the direction of the Z-axis and at right angles to the upper longitudinal side and is therefore inclined forwards and downwards and forms a Z-guide for a tailstock. EP-0 239 564-A2 does not disclose any reason whatsoever for having the upper longitudinal side of the machine bed extending at right angles to the machining plane.

Finally, DE-39 37 330-A1 discloses a lathe having four workpiece spindles with a vertical workpiece spindle axis as well as a machine stand which also extends vertically and has an approximately quadratic cross section and a bed-side carriage of a cross-slide system bearing a tool carrier is guided on each of its four longitudinal sides for displacement in the direction of the Z-axis. Two of these bed-side carriages are, therefore, arranged on respective longitudinal sides of the machine stand forming a slide bed which face away from one another.

So that the resulting slide bed is as rigid as possible, it is recommended that the inventive lathe be designed such that—when viewed vertically onto the machining plane—the two Z-guides of at least one of the two bed-side carriages are arranged in the direction of the X-axis in such a spaced relation to one another that the Z-guides of the two bed-side carriages having the greater distance from the machining plane are spaced at a greater distance from one another in the direction of the X-axis than the Z-guides of these two bed-side carriages located closer to the machining plane. In a lathe of this type, the slide bed can be provided with a large cross section at least on its side remote from the machining plane without the sides of the two bed-side carriages facing the machining plane having to be spaced a large distance from one another. Moreover, a slide bed of this type results in more favourable conditions, with respect to the absorption of the machining forces, at the Z-guides for the lower bed-side carriage than in lathes, in which the Z-guides for a lower bed-side carriage are located one above the other in a plane which extends vertically or is inclined somewhat relative to a vertical plane.

As already mentioned, the attachment surfaces of the machine bed for the headstock in known lathes are also oriented parallel to the machining plane which leads to the disadvantageous results, described in the above, of an unintentional collision between the chuck of the workpiece spindle and a tool carrier. For this reason, it is recommended, when applying the basic concept of the present invention to the headstock, that the latter be attached to the slide bed, namely such that the slide bed—when seen in the direction of the X-axis—has plane attachment surfaces on both sides of the spindle axis, these surfaces extending parallel to one another as well as transversely to the machining plane and the headstock resting on and being attached to these surfaces. Since the headstock can then slide on these attachment surfaces in the direction of the collision forces, the forces occurring at the headstock and at the slide bed are limited and permanent damage is avoided. Moreover, the readjustment of the headstock necessary after a collision is not critical since the parallelism between the headstock supports and the direction of displacement of the bed-side carriages in the direction of the Z-axis has not been altered. Also, attachment surfaces extending transversely to the machining plane offer the possibility of constructing the headstock so that this is very low (in the direction of the X-axis). A lower headstock proves to be extremely advantageous when using workpiece handling devices, such as a gantry-type handling device, since these can then supply and remove the workpieces very closely above the spindle axis.

In a lathe having a headstock attached in this manner, an additional advantage can, ultimately, be easily achieved when the headstock comprises outwardly protruding attachment elements on both sides of the spindle axis, these elements resting on the attachment surfaces of the slide bed, whereby these attachment elements and the spindle axis are located in a common plane. The spindle axis will not then migrate out of its ideal position, namely when the headstock becomes heated during operation of the lathe.

The advantageous embodiment of the inventive lathe last described also offers an additional possibility: If the construction is designed such that the headstock rests against the slide bed only with its attachment elements and that an air gap remains between slide bed and headstock in the region located between its attachment elements, it is possible for air to reach more or less the entire outer surface of the headstock so that the latter is well cooled, above all when this air gap is open at its two longitudinal ends.

Finally, it should be mentioned that in a headstock attached in this manner the cutting forces oriented transversely to the machining plane can be absorbed by the slide bed in an ideal manner since the moment of resistance of the cross section of the slide bed is very high in this direction.

In particularly advantageous embodiments of the inventive lathe, the attachment surfaces for the Z-guides of the bed-side carriages and/or for the headstock are oriented at right angles to the machining plane although, in principle, the regions of the two longitudinal sides of the slide bed provided with the Z-guides, i.e. in particular the specified attachment surfaces, need extend only transversely and not exactly at right angles to the machining plane. Therefore, they can also form small angles of, for example, 5° or 10° with a plane at right angles to the machining plane and extending parallel to the Z-axis without the advantages described above being lessened to any considerable extent.

The preceding explanations show that in particularly advantageous embodiments of the inventive lathe the collision forces can displace the headstock and/or the relevant bed-side carriage in the direction of these collision forces. This was not possible with the known lathes and so considerable forces occurred in them, causing damage which could not or hardly be remedied. As for the rest, the aforementioned considerations concerning collisions apply not only to an unintentional collision of the rapidly rotating chuck of the workpiece spindle with a slide, a tool carrier or a tool but also to an unintentional collision of a tool turret equipped with tools with the chuck, a workpiece held thereby or the headstock. This is understandable when the high indexing speeds of the tool turrets of modern lathes are borne in mind—during indexing of a tool turret, i.e. rotation of the tool turret out its indexing axis, rotation speeds are reached which correspond to a rotational speed of the tool turret about its indexing axis of, for example, 180 revolutions per minute.

In an inventive lathe, the problems explained at the outset in conjunction with the supply of energy to a tool carrier slide system may be solved in an elegant manner in that an arm pointing away from the machining plane is arranged on the side of the lower bed-side carriage facing away from the spindle axis and this arm bears at least one energy supply line, e.g. for driving the additional slide and/or the associated tool carrier. However, this arm can, for example, also serve to hold a line for pressure medium, with which a workpiece chuck device provided on a workpiece spindle held, for example, by a tool turret is actuated. A particularly rigid construction results when an elongated opening extending in the direction of the Z-axis is provided for this arm between machine base and slide bed, this arm penetrating through this opening.

Additional features, advantages and details of the invention result from the attached drawings of two particularly advantageous embodiments of the inventive lathe and/or from the following description of these two embodiments. In the drawings,

BRIEF DESCRIPTION OF THE DRAWING

FIG. 7 is a section at right angles to the Z-axis through one of the Z-guides, namely through the Z-guide for the lower bed-side carriage, located at top left in FIG. 6, whereby in FIG. 7 the regions of the slide bed and the lower bed-side carriage adjacent to this Z-guide have been indicated.

DETAILED DESCRIPTION OF THE PREFERRED EMBODIMENT

First of all, the first embodiment will be described as far as possible on the basis of FIG. 1.

Figure 1:
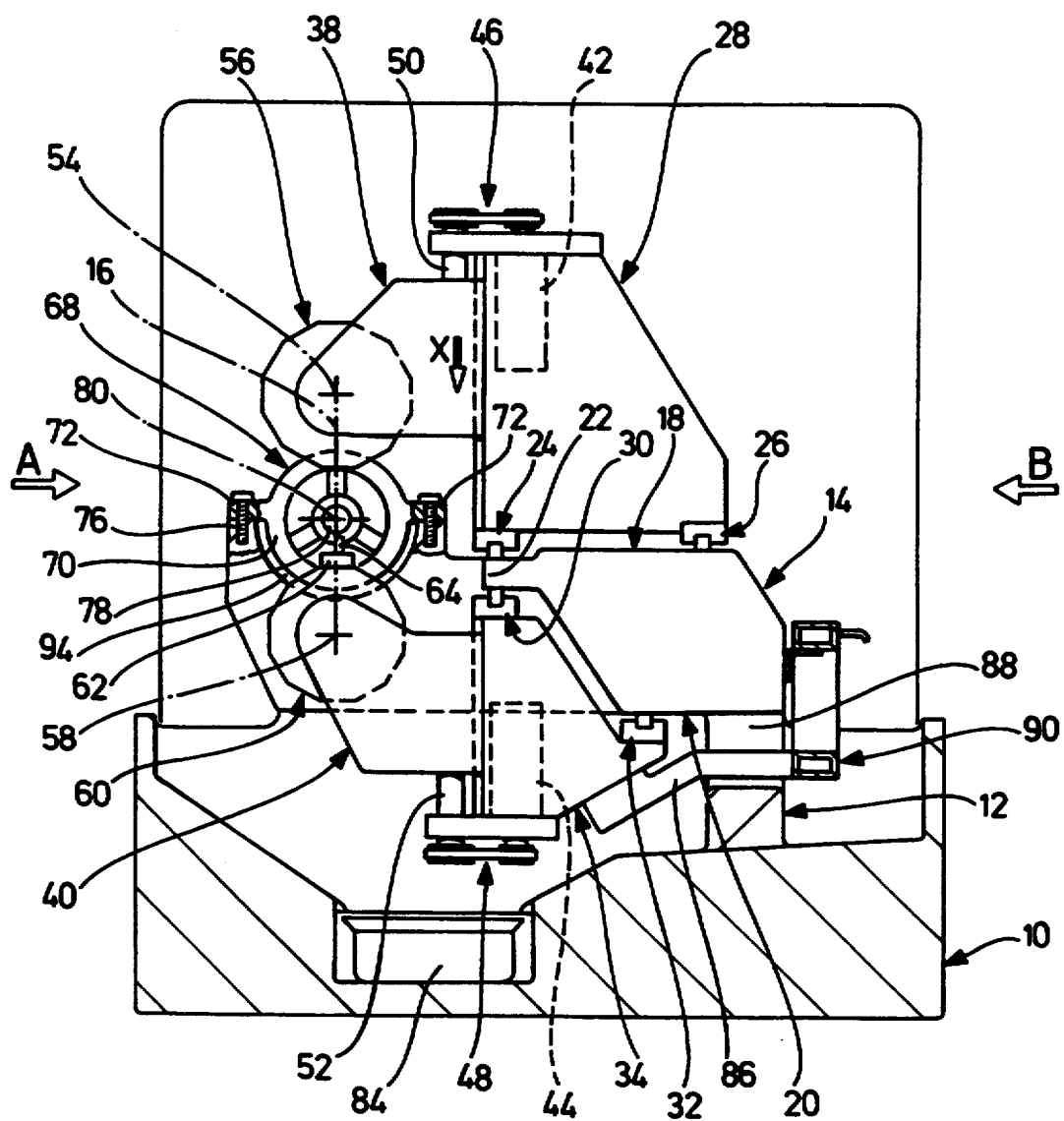
FIG. 1 shows a cross section through the first embodiment of the inventive lathe, relating to a machine having a vertical machining plane.

This inventive lathe comprises a machine base 10, which bears a slide bed 14, in particular, via a bridge 12; the machine base 10, the bridge 12 and the slide bed 14 extend in the direction of the Z-axis which extends at right angles to the plane of drawing of FIG. 1. The left side, according to FIG. 1, of the illustrated lathe forms its front side, in front of which an operator usually stands, so that the region of the lathe located to the left of the slide bed 14 in FIG. 1 forms its operating space. The slide bed advantageously has a cross section which corresponds approximately to the shape of a parallelogram having upper and lower longitudinal sides 18 and 20, respectively, which extend transversely to a machining plane 16 to be explained further on, a cut-off lower and rearward corner region and a carrier rib 22 which faces the machining plane 16 and is integrally formed onto the upper, forward corner of this parallelogram. It is apparent from FIG. 1 that as a result of the illustrated form and arrangement of the carrier rib 22 the upper longitudinal side 18 of the slide bed 14 is stepped (in cross section at right angles to the Z-axis), and for the following the lower longitudinal side of the slide bed 14 is to be understood as its entire underside which is formed by the underside of the carrier rib 22, the surface area extending at an angle downwards and to the rear and the lower surface area of the slide bed 14 extending transversely to the machining plane 16. In the illustrated, particularly advantageous embodiment of the slide bed 14, its lower longitudinal side 20 is therefore stepped (in cross section at right angles to the Z-axis).

Two Z-guides (extending in the direction of the Z-axis) are arranged on the upper longitudinal side 18 of the slide bed 14. These are known longitudinal guideways. Such longitudinal guideways consist roughly of a guided part and a guiding part, of which the one is attached to the slide bed 14 and the other to a bed-side carriage held for displacement along the slide bed. FIG. 1 shows a front, upper Z-guide 24 and a rear, upper Z-guide 26 which, together, bear an upper bed-side carriage 28. In the same way, a front, lower Z-guide 30 and a rear, lower Z-guide 32 are arranged on the lower longitudinal side 20 of the slide bed 14 and these guides, together, bear a lower bed-side carriage 34 which is suspended according to the invention from the underside of the slide bed 14, i.e. by means of the lower Z-guides 30, 32 on the slide bed 14. The two bed-side carriages 28 and 34 are intended, according to the invention, to have recesses and/or cavities which are not illustrated and in which elements or components of the lathe can be arranged. More details will be given in this respect in the following.

A slide is held on each of the front sides of the two bed-side carriages 28 and 34 for displacement in the direction of the so-called X-axis of the lathe; the direction of the X-axis is indicated in FIG. 1 by an arrow, it is oriented parallel to the machining plane 16 and at right angles to the Z-axis. These two slides are an upper X-slide 38 guided on the upper bed-side carriage 28 and a lower X-slide 40 guided on the lower bed-side carriage 34. A drive motor 42 or 44, designated as X-motor, is arranged in recesses or cavities of each of the two bed-side carriages 28 and 34. Each drive motor drives a ball roll spindle 50 and 52, respectively, via a gear 46 and 48, respectively, illustrated as a belt gear. The spindles extend in the direction of the X-axis and serve to displace the X-slide 38 and the X-slide 40, respectively. The guide means and ball roll spindles serving to guide and drive the X-slides 38 and 40 are known machine components and so these need not be explained in further detail.

A tool carrier is mounted on each of the two X-slides 38 and 40 and these are advantageously tool turrets, of which at least one has an indexing axis parallel to the Z-axis. FIG. 1 shows an upper tool turret 56 which is arranged on the upper X-slide and mounted for rotation about an indexing axis 54 as well as a lower tool turret 60 which is arranged on the lower X-slide 40 and mounted for rotation about an indexing axis 58. In this respect, it is particularly advantageous for the two indexing axes 54 and 58 to be located in the machining plane 16 and for both to be oriented parallel to the Z-axis. On the lower tool turret 60, a tool holder 62 borne thereby and having a lathe tool 64 is indicated, the upwardly lying cutting edge of which is, according to the invention, located in the machining plane 16 and can be displaced in the direction of the X-axis by movement of the X-slide 40 in this machining plane.

Figure 2:
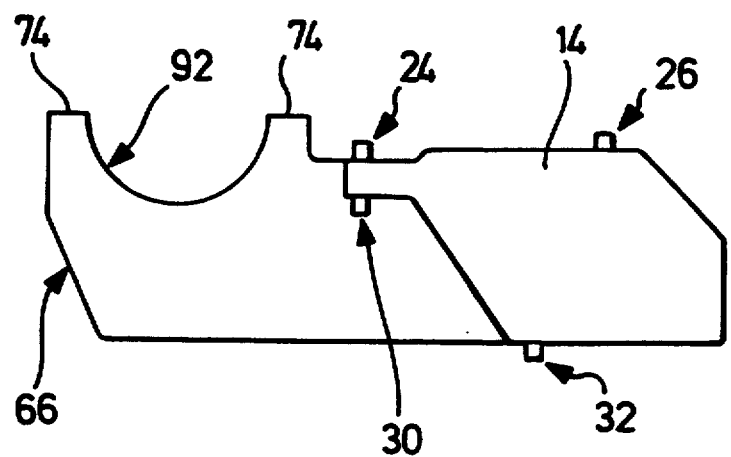
FIG. 2 is a front view of the slide bed, seen in the direction of the Z-axis.
Figure 3:
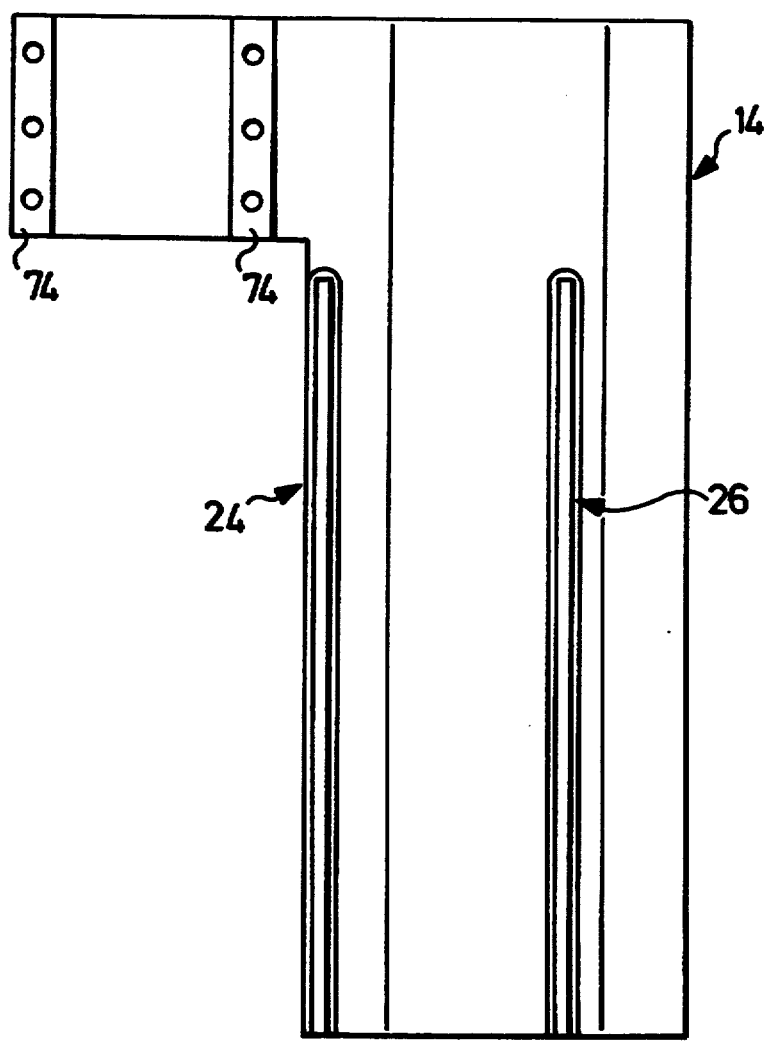
FIG. 3 is a plan view onto the slide bed.

As shown most clearly in FIGS. 2 and 3, a headstock carrier 66 is attached to the slide bed 14 and is, in particular, integral with the slide bed 14. This headstock carrier 66 advantageously has the design of a beam or arm which bears a headstock 68 (cf. FIG. 1). The headstock 68 has, in particular, an approximately circular-cylindrical headstock housing 70 having two lateral attachment ribs 72, for which the headstock carrier 66 has two support and attachment surfaces 74 on its upper side. These are, according to the invention, plane, parallel to one another (they can also be located in a common plane) and oriented transversely, in particular at right angles, to the machining plane 16 and they extend in the direction of the Z-axis. Fastening screws 76 serve to secure the headstock 68 on the headstock carrier 66.

A workpiece spindle 78 is mounted in the headstock housing 70 so as to be rotatable but axially non-displaceable. This is advantageously a so-called motor spindle, with which the actual workpiece spindle 78 is combined with a motor, which is not illustrated, to form a constructional unit, whereby this motor rotates the actual workpiece spindle 78 about a spindle axis 80 which is located, according to the invention, in the machining plane 16 and is oriented parallel to the Z-axis or rather defines the direction of the Z-axis. The workpiece spindle 78 is intended to carry a workpiece clamping means, which is not illustrated, at its end facing the person looking at FIG. 1 so that a workpiece held by the workpiece spindle can, for example, be subjected to a rotary machining with the aid of the tool 64. The machining plane 16 is, therefore, that plane, in which the cutting edge or tip of the tool 64 may be pushed forward towards the spindle axis 80 in a radial direction relative to the spindle axis 80 in order, for example, to reduce the diameter of a workpiece. It is also readily apparent from FIG. 1 that the machining forces occurring during machining of a workpiece with the aid of, for example, the tool 64 are oriented essentially at right angles to the machining plane 16. Chips resulting during machining fall downwards in the operating space onto upper inclined surfaces of the machine base and, from there, into a chip trough 84 which can, however, be replaced by, for example, a chip conveyor.

FIG. 1 illustrates how, for example, energy and/or control signals can be supplied to the lower X-motor 44, a motor which is not illustrated for rotating the lower tool turret 60 about its indexing axis 58, a clamping device for clamping a tool held by the lower tool turret 60 and/or a drive motor, also not illustrated, for a tool or workpiece spindle held by the tool turret 60: For this purpose, an energy supply arm 86 is attached to the lower bed-side carriage 34 in accordance with the invention and this arm penetrates through a window 88 in the form of an elongated opening in the bridge 12 extending in the direction of the Z-axis and leads to a so-called energy guide chain 90 which is a flexible, hollow structure, in the interior of which energy and signal lines, which are not illustrated, are accommodated. The one end of such an energy guide chain 90 is secured to the machine, the other end is rigidly connected to the energy supply arm 86 so that, in this way, energy and signals can be transferred to the lower bed-side carriage 34.

FIGS. 1 and 2 ultimately illustrate an additional, essential advantage of the inventive lathe: The headstock carrier 66 has at the top between its attachment surfaces 74 a recess 92 for accommodating the headstock 68. Since its housing 70 has, in the illustrated, preferred embodiment, a circular-cylindrical shape, the recess 92 is semicircular-cylindrical in shape but with a larger radius than that of the outer surface of the headstock housing 70. This means that an air gap 94 open to the front and rear results between this housing and the surface of the recess 92 and the air gap leads to the surface of the headstock 68 being cooled by the ambient air almost overall. The outer contour of the headstock 69 could, of course, also correspond, for example, to a square, whereby the contour of the recess 92 of the headstock carrier 66 would then be shaped accordingly.

Figure 4:
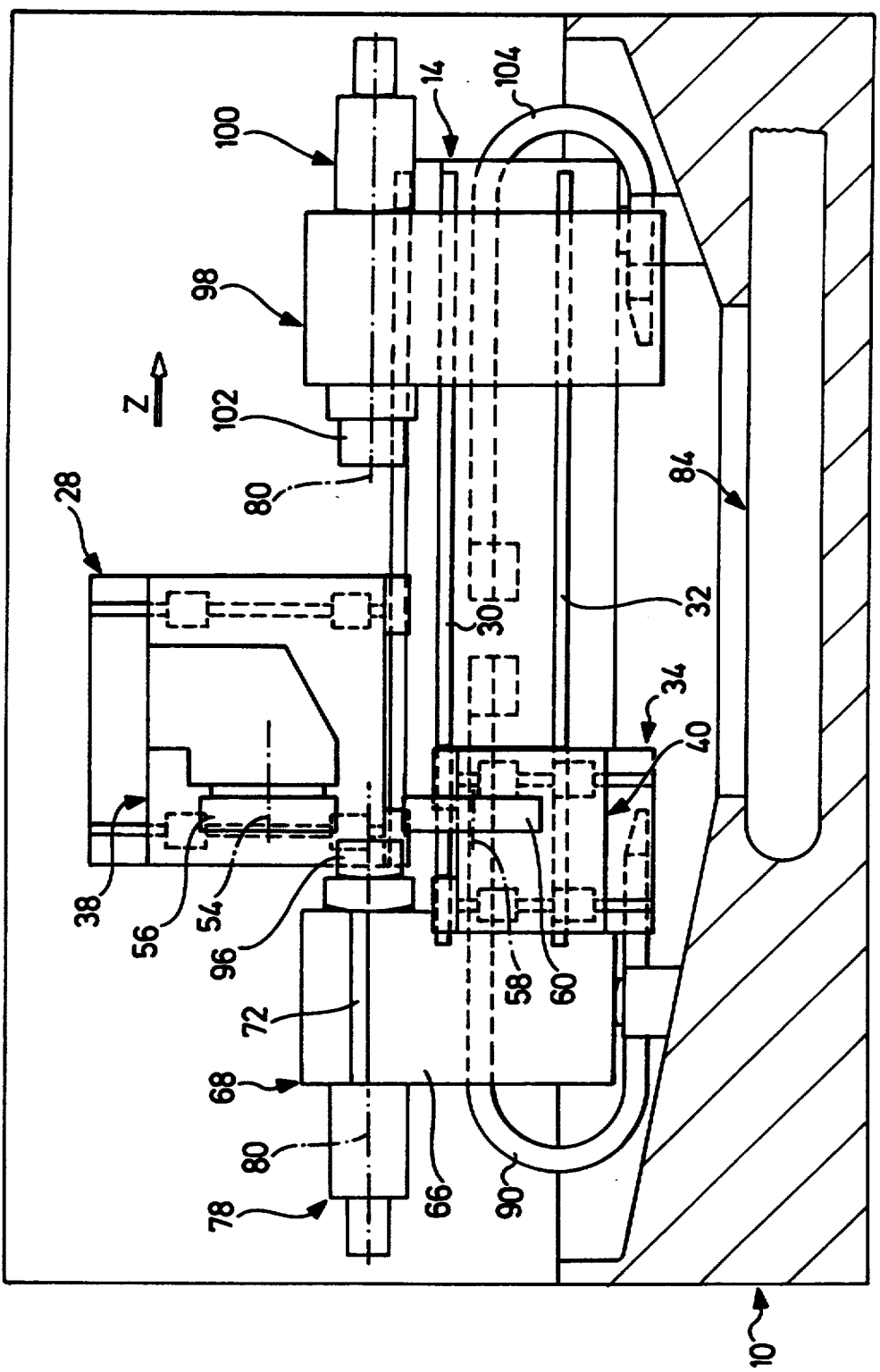
FIG. 4 is a front view of the lathe according to FIG. 1, seen in the direction of arrow "A" in FIG. 1.

The front view illustrated in FIG. 4 of the preferred, first embodiment of the inventive lathe shows additional components of this machine: On the one hand, FIG. 4 illustrates a chuck 96 of the workpiece spindle 78, in which a workpiece to be machined can be held. Furthermore, FIG. 4 shows an additional headstock 98 for a second workpiece spindle 100 which is, according to the invention, held and guided on the slide bed 14 for displacement on the two Z-guides 30 and 32 for the lower bed-side carriage 34 in the direction of the Z-axis indicated in FIG. 4 by means of an arrow. The second workpiece spindle 100, which is provided with a second chuck 102 and customarily designated as a counterspindle, has a spindle axis which coincides with the spindle axis 80, i.e. the two chucks 96 and 102 are arranged opposite and coaxial to one another. Finally, FIG. 4 shows a second energy guide chain 104 for the second headstock 98.

Figure 5:
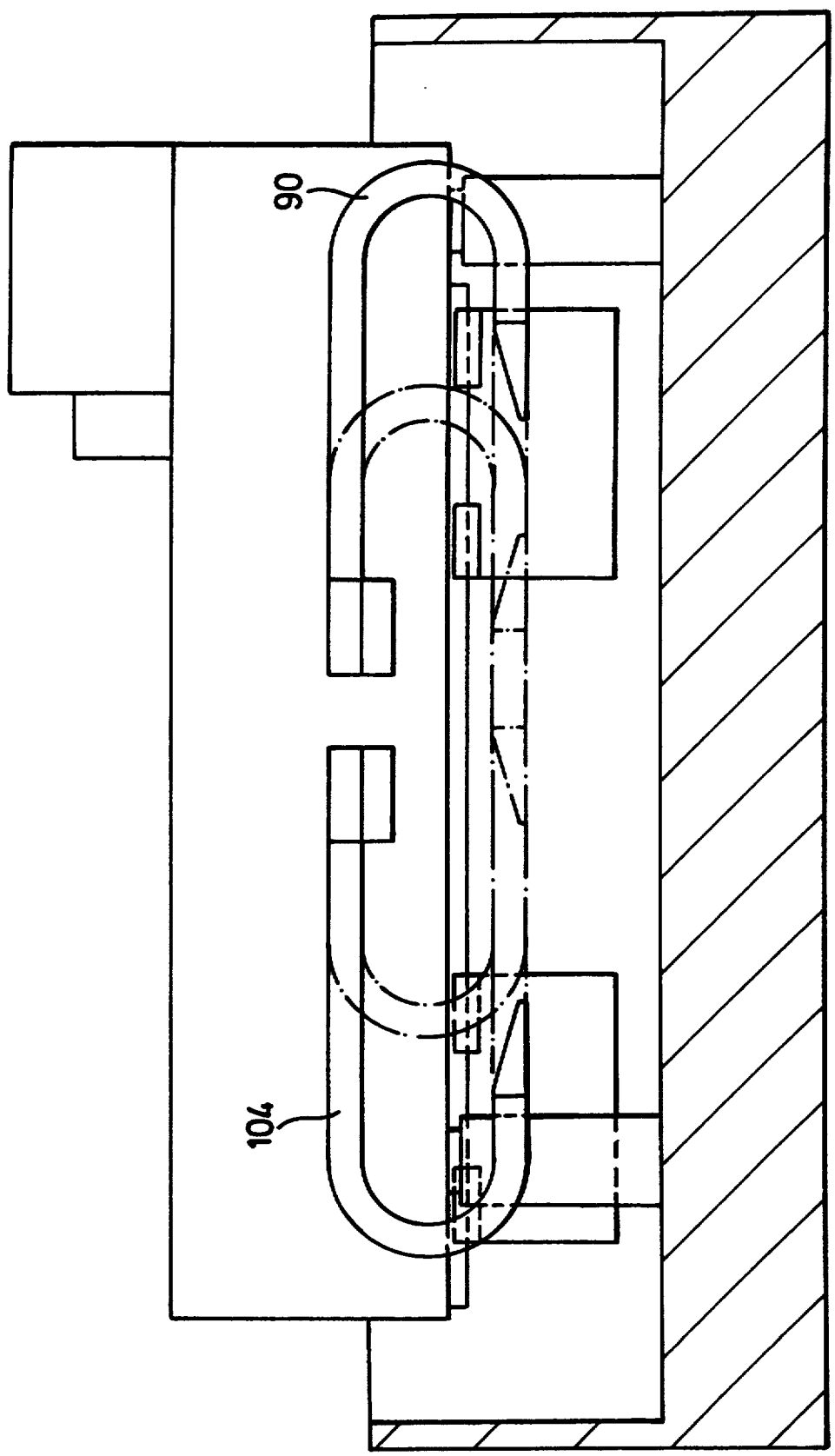
FIG. 5 is a rear side view of this machine, seen in the direction of the arrow "B" in FIG. 1.

The rear side view shown in FIG. 5 of the first embodiment of the inventive lathe does not show all the parts of this lathe because it is intended to serve merely to show the two energy guide chains 90 and 104 somewhat more clearly.

It can also be seen from FIGS. 4 and 5 that workpieces held both by the workpiece spindle 78 and by the counterspindle 100 can be machined with tools of both tool turrets 56 and 60 independently of one another. For example, work can be done with the one tool turret on a workpiece held by the one workpiece spindle while a workpiece held by the other workpiece spindle is being machined with a tool of the other tool turret. However, it is also possible to machine a workpiece, which is held either by the workpiece spindle 78 or by the counterspindle 100, simultaneously with tools of both tool turrets.

Figure 6:
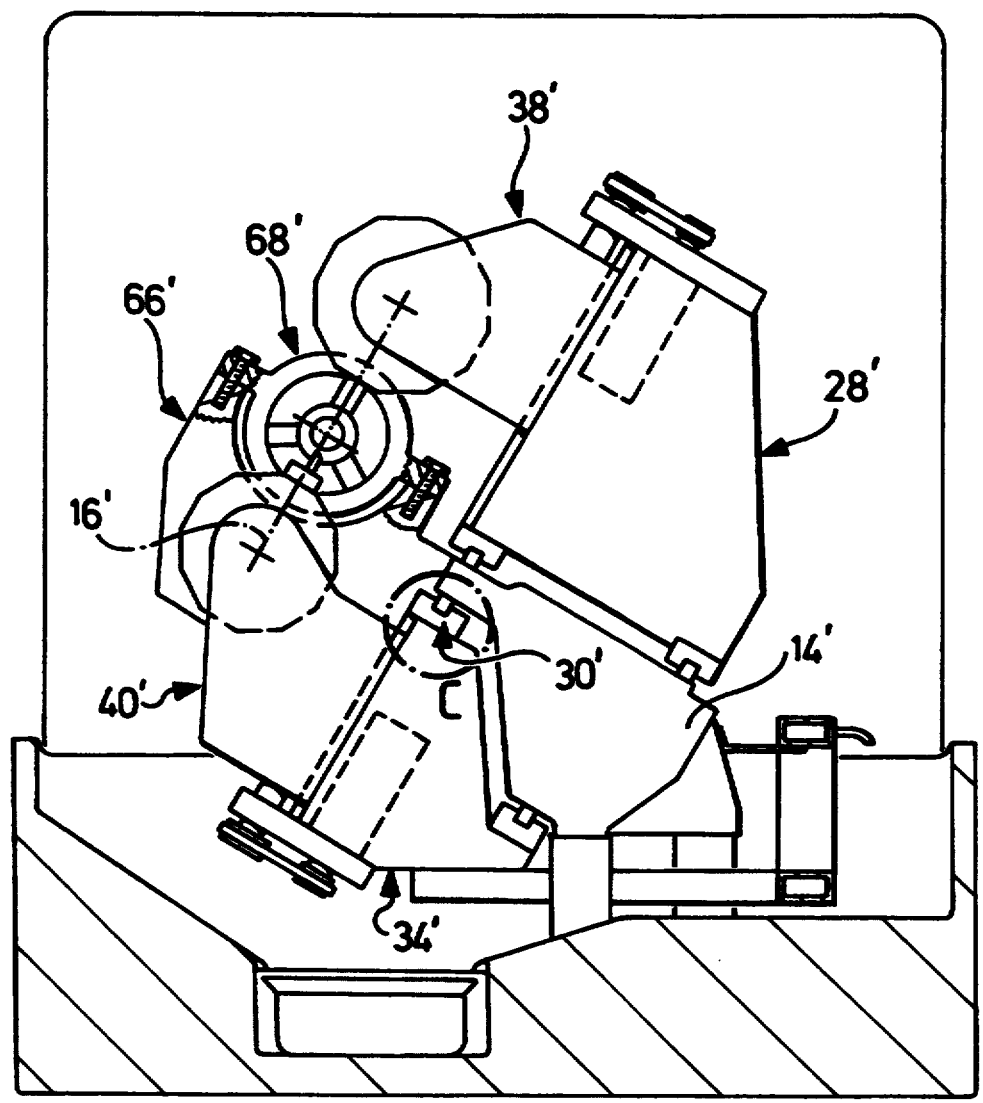
FIG. 6 is a sectional illustration corresponding to FIG. 1 of the second embodiment, relating to a so-called sloping bed machine.

FIG. 6 shows in a section corresponding to FIG. 1 the second preferred embodiment of the inventive lathe which differs from the first embodiment illustrated in FIG. 1, insofar as this is relevant for the present invention, only in that a machining plan 16' is inclined relative to the vertical through an angle of approximately 30° towards the rear. Consequently, the slide bed 14', the slides 28', 38', 34' and 40', the headstock carrier 66' and the headstock 68' are also arranged so as to be inclined relative to the horizontal through the same angle towards the rear or downwards. It is therefore unnecessary to describe the second embodiment in greater detail.

FIG. 7 shows the section marked "C" in FIG. 6 on a larger scale and in detail, i.e. the forward, lower Z-guide 30' of the lathe shown in FIG. 6 with the regions of the lower bed-side carriage 34' and the slide bed 14' adjoining this guide. All the other Z-guides, including the Z-guides 24, 26, 30 and 32 of the lathe illustrated in FIG. 1 can have the same construction as the Z-guide 30' illustrated in FIG. 7.

FIG. 7 shows a guide bar 202 secured to the slide bed 14' by means of screws 200, this bar being guided for longitudinal displacement, i.e. in the direction of the Z-axis and therefore at right angles to the plane of drawing in FIG. 7, in a guide rail 206 secured to the lower bed-side carriage 34' by means of screws 204. In the inventive design of the lathe illustrated in FIG. 7, the upper side of the lower bed-side carriage 34' forms an attachment surface 208 which is plane and parallel to a corresponding attachment surface of the lower bed-side carriage 34' for its second Z-guide and is oriented in the direction of the Z-axis as well as transversely and, in particular, at right angles to the machining plane 16'. The same applies to attachment surfaces of the upper bed-side carriage 28' for its two Z-guides. The construction could, however, also be designed such that the guide rails 206 for the two bed-side carriages 28' and 34' are secured to the slide bed 14' and, consequently, the slide bed is provided with attachment surfaces corresponding to the attachment surfaces 208. The same applies to an attachment surface 210 for the guide bar 202, whereby in the embodiment illustrated in FIG. 7 the attachment surface 210 is provided on the underside of the slide bed 14', as well as to additional attachment surfaces for the guide bars 202 of the other Z-guides corresponding to the attachment surface 210.

In the preferred embodiment illustrated in FIG. 7, the bed-side carriage has a rib 210 on its longitudinal edge region facing the machining plane and the slide bed. Part of the attachment surface 208 is formed on this rib. Moreover, FIG. 7 indicates a recess 212 formed on or in the bed-side carriage which can form a space for accommodating machine elements to be housed in the bed-side carriage and facilitates the tapping and tightening of the screw 204 shown on the right in FIG. 7.

The Z-guide 30' illustrated in FIG. 7, which is known per se and available on the market, is designed, in addition, as follows: Closure plates which are not illustrated are attached to the front ends of the guide rails 206 and these plates have recesses which allow the guide bar 202 to pass through in the direction of the Z-axis but not the balls 214, 216, 218 and 220 of four sets of balls which serve to mount the guide bar 202 in the guide rail 206. The guide rail 206 is provided at its front ends with known deflecting channels, which are also not illustrated, as well as return channels extending along the guide rails 206, and likewise not illustrated, for the balls of these four sets of balls.

The following is apparent from FIGS. 1 and 6 in conjunction with FIG. 7:

As mentioned in the above, the forces occurring during the cases of collision as described are predominantly oriented transversely to the machining plane 16 or 16'. In an inventive lathe, these considerable forces cannot lead to damage which is not relatively easy to remedy since not only the headstock 68 or 68' can be moved in the direction of these forces on its attachment surfaces 74 (when the fastening screws 76 break) but also the guide rails 206 are displaceable in the direction of these forces on their attachment surfaces 208 (when the screws 204 break). In the case of such a collision, the spindle axis 80 consequently remains in that plane extending transversely to the machining plane, in which it was also located prior to the collision and so it is merely necessary to readjust the spindle axis 80 in this plane so that it again extends parallel to the Z-axis. In a corresponding manner, the support surfaces of the guide rails 206 remain, in the case of such a collision, in that plane or planes extending transversely to the machining plane, in which these support surfaces were located prior to the collision. This means this it is merely necessary to readjust the guide rails 206 in this plane or in these planes, following such a collision, in order to align them in the direction of the Z-axis.

In accordance with the foregoing remarks, the term "transverse" within the meaning of the claims is to be understood such that the regions of the two longitudinal sides of the slide bed provided with the Z-guides define surfaces which form an acute angle or a right angle with the machining plane; in preferred embodiments, this angle is approximately 75° to 90°, and an angle of 90° is particularly advantageous.

The present disclosure relates to the subject matter disclosed in German application No. P 42 29 423.1 of Sep. 3, 1992, the entire specification of which is incorporated herein by reference.

What is claimed is:

1. A lathe comprising a machine base, at least one headstock, a workpiece spindle for holding a workpiece to be machined being mounted therein for rotation about a spindle axis defining the direction of a Z-axis of the lathe, a slide bed rigidly connected to the machine base and having longitudinal sides extending in the direction of the Z-axis, and at least two tool carrier slide systems held on longitudinal sides of the slide bed for displacement in the direction of the Z-axis, each of said slide systems having a bed-side carriage guided on the slide bed in the direction of the Z-axis as well as at least one additional slide displaceable in the direction of an X-axis of the lathe extending at right angles to the Z-axis such that a tool of a tool carrier held by the relevant slide system is displaceable parallel to the X-axis in a radial direction relative to the spindle axis and the spindle axis defines a machining plane with the direction of the X-axis, said plane forming with a horizontal plane extending through the spindle axis an angle of at least approximately 45° and at the most approximately 90°, two Z-guides extending in the direction of the Z-axis being provided on each of two longitudinal sides of the slide bed for each of the respective bed-side carriages, characterized in that the slide bed (14) is designed such that—when seen in the direction of the Z-axis (80)—the two bed-side carriages (28, 34) are arranged on longitudinal sides (18, 20) of the slide bed (14) facing away from one another and that the regions of the one longitudinal side (18) of the slide bed (14) provided with the two Z-guides (24, 26) for the one bed-side carriage (28) extend not only parallel to one another but also parallel to the regions of the other longitudinal side (20) of the slide bed (14) provided with the two Z-guides (30, 32) for the other bed-side carriage (34) as well as transversely to the machining plane (16).

2. Lathe as defined in claim 1, characterized in that the slide bed (14) has on its longitudinal sides (18, 20) bearing the two bed-side carriages (28, 34) plane attachment surfaces (210) extending in the direction of the Z-axis (80), the Z-guides (24, 26, 30, 32; 30') being attached to said surfaces, all these attachment surfaces (210) extending transversely to the machining plane (16) and parallel to one another.

3. The lathe as defined in claim 2 wherein the attachment surfaces extend at right angles to the machining plane.

4. Lathe as defined in claim 1, characterized in that—when viewed at right angles onto the machining plane (16)—the two Z-guides (24, 26, 30, 32) of at least one of the two bed-side carriages (28, 34) are arranged in the direction of the X-axis in such a spaced relation to one another that the Z-guides (26, 32) of the two bed-side carriages (28, 34) having the greater distance from the machining plane (16) are spaced at a greater distance from one another in the direction of the X-axis than the Z-guides (24, 30) of these two bed-side carriages located closer to the machining plane (16).

5. Lathe as defined in claim 1, characterized in that the headstock (68) is attached to the slide bed (14), the latter—when seen in the direction of the X-axis—having plane attachment surfaces (74) on both sides of the spindle axis (80), these surfaces extending parallel to one another as well as transversely to the machining plane (16) and the headstock (68) resting on these surfaces.

6. Lathe as defined in claim 5, characterized in that the headstock (68) is provided with outwardly protruding attachment elements (72) on both sides of the spindle axis (80), said elements resting on the attachment surfaces (74) of the slide bed (14), and that these attachment elements (72) and the spindle axis (80) are located in a common plane.

7. Lathe as defined in claim 5, characterized in that the headstock (68) rests on the slide bed (14) only with its attachment elements (72) and that in the region located between the attachment elements (72) an air gap (94) is provided between slide bed (14) and headstock (68).

8. Lathe as defined in claim 7, characterized in that the air gap (94) is open at its two longitudinal ends.

9. The lathe as defined in claim 5, wherein the attachment surfaces extend at right angles to the machining plane.

10. Lathe as defined in claim 1, characterized in that—when seen from above in the direction of the X-axis—the one bed-side carriage (28) is arranged above the slide bed (14) and the other bed-side carriage (34) beneath the slide bed.

11. Lathe as defined in claim 10, characterized in that an arm (86) pointing away from the machining plane (16) is arranged on the side of the lower bed-side carriage (34) facing away from the spindle axis (80), said arm bearing at least one energy supply line.

12. Lathe as defined in claim 11, characterized in that an elongated opening (88) extending in the direction of the Z-axis (80) is provided between machine base (10) and slide bed (14), the arm (86) penetrating through said opening.

13. Lathe as defined in claim 1, characterized in that at least one of the two bed-side carriages (28, 34) forms a housing for accommodating at least one machine part (42, 44).

14. Lathe as defined in claim 13, characterized in that both bed-side carriages (28, 34) form housings for accommodating machine parts (42, 44).

15. Lathe as defined in claim 13, characterized in that the housing accommodates a drive motor (42, 44) for displacing an additional slide (38, 40) borne by the bed-side carriage (28, 34).

* * * * *

UNITED STATES PATENT AND TRADEMARK OFFICE
CERTIFICATE OF CORRECTION

PATENT NO. : 5,429,020

DATED : JULY 4, 1995

INVENTOR(S) : EBERHARD HACK AND GÜNTER SCHLEICH

It is certified that error appears in the above-identified patent and that said Letters Patent is hereby corrected as shown below:

ON THE TITLE PAGE:

Item: [56] References Cited

U.S. PATENT DOCUMENTS

Second column, line 2, delete "Holt et al." and substitute therefor -- Holy et al. --.

Column 7, line 10, "BRIEF DESCRIPTION OF THE DRAWINGS" should be moved from line 10 and above the paragraph starting with "Additional features, ...".

Signed and Sealed this

Tenth Day of October, 1995

Attest:

BRUCE LEHMAN

Attesting Officer     Commissioner of Patents and Trademarks